US009079498B2

(12) United States Patent
Small et al.

(10) Patent No.: US 9,079,498 B2
(45) Date of Patent: Jul. 14, 2015

(54) MORPHING VEHICLE USER INTERFACE

(75) Inventors: Evan Small, Palo Alto, CA (US);
Vincent George Johnston, Half Moon Bay, CA (US)

(73) Assignee: Tesla Motors, Inc., Palo Alto, CA (US)

(*) Notice: Subject to any disclaimer, the term of this patent is extended or adjusted under 35 U.S.C. 154(b) by 663 days.

(21) Appl. No.: 12/725,391

(22) Filed: Jun. 16, 2010

(65) Prior Publication Data

US 2011/0082627 A1 Apr. 7, 2011

Related U.S. Application Data

(63) Continuation-in-part of application No. 12/708,547, filed on Feb. 19, 2010, now Pat. No. 8,078,359.

(60) Provisional application No. 61/278,337, filed on Oct. 5, 2009.

(51) Int. Cl.
*B60K 37/06* (2006.01)
*B60K 35/00* (2006.01)
*G06F 3/0488* (2013.01)

(52) U.S. Cl.
CPC ............. *B60K 37/06* (2013.01); *B60K 35/00* (2013.01); *G06F 3/04886* (2013.01); *B60K 2350/1024* (2013.01); *B60K 2350/1028* (2013.01)

(58) Field of Classification Search
CPC ....... G06F 3/017; G06F 3/041; G06F 3/0488; G06F 15/0208; G06F 1/1694; G06F 2203/04806; G06F 3/0485; G06F 3/04886; G06F 3/016; G06F 3/0414; G06F 3/04883; G06F 8/34; F24F 11/0086; F24F 2011/009; B60K 35/00; B60K 37/06; B60K 2350/1028; B60K 2350/1024; G05B 19/042
See application file for complete search history.

(56) References Cited

U.S. PATENT DOCUMENTS

| | | | |
|---|---|---|---|
| 5,555,502 A | 9/1996 | Opel | |
| 5,859,628 A * | 1/1999 | Ross et al. | 345/173 |
| 6,298,305 B1 | 10/2001 | Kadaba et al. | |
| 6,308,203 B1 | 10/2001 | Itabashi et al. | |
| 6,374,173 B1 | 4/2002 | Ehlbeck | |
| 6,650,345 B1 * | 11/2003 | Saito et al. | 715/764 |
| 6,771,063 B2 | 8/2004 | Stolfus | |

(Continued)

FOREIGN PATENT DOCUMENTS

| | | |
|---|---|---|
| EP | 1420333 A2 | 5/2004 |
| EP | 1702805 A1 | 9/2006 |

(Continued)

OTHER PUBLICATIONS slide.pdf (slide—definition of slide by the Free Online Dictionary, Thesaurus and Encyclopedia., Oct. 30, 2013, Free Online Dictionary, pp. 1-5).*

(Continued)

*Primary Examiner* — Bao Long T Nguyen
(74) *Attorney, Agent, or Firm* — J. Richard Soderberg

(57) ABSTRACT

A method for operating a vehicle user interface is provided, the user interface utilizing a touch-screen display mounted within the vehicle. In one aspect, the visual or visual/interactive properties of the interface change after the user initiates interface interaction. In another aspect, the interface allows a user to utilize any of a variety of different control interaction techniques, all to achieve the same function.

20 Claims, 5 Drawing Sheets

(56) References Cited

U.S. PATENT DOCUMENTS

| | | | |
|---|---|---|---|
| 6,775,603 | B2 | 8/2004 | Yester et al. |
| 6,819,990 | B2 * | 11/2004 | Ichinose ............... 701/36 |
| 6,859,687 | B2 | 2/2005 | Obradovich et al. |
| 6,956,470 | B1 | 10/2005 | Heise et al. |
| 7,043,699 | B2 | 5/2006 | Obradovich |
| 7,292,228 | B2 * | 11/2007 | Nagasaka et al. ............ 345/173 |
| 7,489,303 | B1 | 2/2009 | Pryor |
| 7,683,771 | B1 | 3/2010 | Loeb |
| 7,698,033 | B2 | 4/2010 | Hering et al. |
| 7,730,401 | B2 | 6/2010 | Gillespie et al. |
| 7,853,366 | B2 | 12/2010 | Imura et al. |
| 7,978,056 | B2 | 7/2011 | Mercurio et al. |
| 8,078,359 | B2 | 12/2011 | Small et al. |
| 8,188,887 | B2 | 5/2012 | Catten et al. |
| 8,566,045 | B2 * | 10/2013 | Shaffer et al. ............... 702/57 |
| 2002/0177944 | A1 | 11/2002 | Ihara et al. |
| 2003/0220722 | A1 | 11/2003 | Toba et al. |
| 2005/0143884 | A1 | 6/2005 | Bihler et al. |
| 2005/0261815 | A1 | 11/2005 | Cowelchuk et al. |
| 2006/0017552 | A1 | 1/2006 | Andreasen et al. |
| 2006/0022955 | A1 * | 2/2006 | Kennedy ............... 345/173 |
| 2006/0026535 | A1 * | 2/2006 | Hotelling et al. ............ 715/863 |
| 2006/0028453 | A1 | 2/2006 | Kawabe |
| 2006/0146039 | A1 * | 7/2006 | Prados et al. ............... 345/173 |
| 2006/0155431 | A1 | 7/2006 | Berg |
| 2006/0155445 | A1 | 7/2006 | Browne et al. |
| 2006/0161871 | A1 | 7/2006 | Hotelling et al. |
| 2006/0277495 | A1 | 12/2006 | Obradovich |
| 2007/0124043 | A1 | 5/2007 | Ayoub et al. |
| 2007/0176797 | A1 | 8/2007 | Rhodes et al. |
| 2007/0262953 | A1 | 11/2007 | Zackschewski |
| 2007/0262965 | A1 * | 11/2007 | Hirai et al. ............... 345/173 |
| 2008/0036743 | A1 * | 2/2008 | Westerman et al. ......... 345/173 |
| 2008/0082920 | A1 | 4/2008 | Eom |
| 2008/0122798 | A1 | 5/2008 | Koshiyama et al. |
| 2008/0177458 | A1 | 7/2008 | Malone et al. |
| 2008/0211779 | A1 | 9/2008 | Pryor |
| 2008/0243373 | A1 | 10/2008 | Cat et al. |
| 2008/0282173 | A1 | 11/2008 | Kim et al. |
| 2009/0021491 | A1 | 1/2009 | Kawamura |
| 2009/0144661 | A1 | 6/2009 | Nakajima et al. |
| 2009/0174677 | A1 * | 7/2009 | Gehani et al. ............... 345/173 |
| 2009/0210110 | A1 | 8/2009 | Dybalski et al. |
| 2009/0244016 | A1 | 10/2009 | Casparian et al. |
| 2009/0259969 | A1 * | 10/2009 | Pallakoff ............... 715/808 |
| 2009/0315848 | A1 * | 12/2009 | Ku et al. ............... 345/173 |
| 2010/0070093 | A1 * | 3/2010 | Harrod et al. ............... 700/278 |
| 2010/0070932 | A1 | 3/2010 | Hur |
| 2010/0088632 | A1 * | 4/2010 | Knowles et al. ............ 715/784 |
| 2010/0095245 | A1 | 4/2010 | Fino et al. |
| 2010/0271385 | A1 | 10/2010 | Lan et al. |
| 2010/0318266 | A1 | 12/2010 | Schaaf et al. |
| 2011/0001722 | A1 * | 1/2011 | Newman et al. ............ 345/174 |
| 2011/0035700 | A1 * | 2/2011 | Meaney et al. ............ 715/784 |

FOREIGN PATENT DOCUMENTS

| | | | |
|---|---|---|---|
| EP | 2050610 | A1 | 4/2009 |
| EP | 1065413 | A1 | 1/2011 |
| JP | 2003-146055 | | 5/2003 |
| JP | 2007-030633 | | 2/2007 |
| JP | 2008-285046 | | 11/2008 |
| JP | 2008-292219 | | 12/2008 |
| JP | 2009-057013 | | 3/2009 |
| WO | WO 03/039914 | A1 | 5/2003 |
| WO | WO 2004/081777 | | 9/2004 |

OTHER PUBLICATIONS swipe.pdf (swipe—definition of swipe by the Free Online Dictionary, Thesaurus and Encyclopedia. Oct. 31, 2013 Free Online Dictionary, pp. 1-5).* http://windows.microsoft.com/en-us/windows7/Arrange-windows-side-by-side-on-the-desktop-using-Snap archived Jun. 29, 2009 on http://www.archive.org/web/web.php.

slide.pdf (slide—definition of slide by the Free Online Dictionary, Thesaurus and Encyclopedia, Oct. 30, 2013, Free Online Dictionary, pp. 1-5).

swipe.pdf (swipe—definition of swipe by the Free Online Dictionary, Thesaurus and Encyclopedia, Oct. 31, 2013, Free Online Dictionary, pp. 1-5).

* cited by examiner

MORPHING VEHICLE USER INTERFACE

CROSS-REFERENCE TO RELATED APPLICATION

This application is a continuation-in-part of U.S. patent application Ser. No. 12/708,547, filed Feb. 19, 2010, and claims the benefit of the filing date of U.S. Provisional Patent Application Ser. No. 61/278,337, filed Oct. 5, 2009, the disclosures of which are incorporated herein by reference for any and all purposes.

FIELD OF THE INVENTION

The present invention relates generally to an interface and, more particularly, to a vehicle user interface operable in multiple ways.

BACKGROUND OF THE INVENTION

A conventional vehicle includes various systems that allow the user, i.e., the driver or passenger, a means of interfacing with the vehicle, specifically providing a means for monitoring vehicle conditions and controlling various vehicle functions. Depending upon the complexity of the systems to be monitored and/or controlled, such a user interface may utilize visual, tactile and/or audible feedback. In a typical vehicle, the systems and conditions that may be monitored and/or controlled by such an interface include climate control (e.g., temperature settings, fan settings, defroster operation, etc.); entertainment system control (e.g., audio source, radio station, audio track, tonal balance, volume, etc.); and the navigation system (e.g., map, destination and route, estimated time of arrival (ETA), miles to destination, etc.).

While the cost of the various controls and subsystems that encompass a vehicle's user interface may make up only a small fraction of the total vehicle cost, the user interface, as the primary source of interaction between the user and the vehicle, is critical to the driver's operation and enjoyment of the vehicle. For instance, a poorly designed or poorly positioned headlight or windshield wiper switch may require the driver to divert attention from the road for an unsafe period of time in order for the driver to turn on the headlights or wipers. In other instances, an overly complex or poorly designed interface, for example an audio or navigation interface, may quickly lead to user frustration and dissatisfaction, and potentially lost car sales.

In a conventional vehicle, the user interface is actually comprised of multiple interfaces, each interface grouping together those controls necessary to monitor and/or operate a specific vehicle subsystem or function. For example, the controls and display for the audio system are typically co-located as are the controls for the heating, ventilation and air conditioning (HVAC) system. In addition to simplifying subsystem control, co-location of controls allows the manufacturer to utilize a modular approach in which several options for a particular system, e.g., the audio system, may be provided. Not only does this approach simplify upgrades, it also allows the manufacturer to design and build a single subsystem that can be integrated into several different vehicle models.

In the past decade, the advent of dash-mounted monitors has caused a major change in the design of vehicle interfaces. In addition to being used in navigation systems, such monitors allow various information to be communicated to the user as well as providing a novel technique for controlling system functionality. For example, in addition to its use in the navigation system, some vehicles use a multi-page menu approach to provide the driver and/or passenger with control over the audio system, the HVAC system, on-board or Bluetooth® enabled/coupled communication devices, etc. In such an application, either a touch-sensitive display may be used or a non-touch-sensitive monitor may be used with corresponding hard buttons (e.g., mounted around the periphery of the display) or with a mouse-like pointer that allows selection of designated functions.

While conventional vehicles provide a variety of devices and techniques for the driver and/or passenger to control and monitor the vehicle's various subsystems and functions, typically a specific vehicle or specific vehicle model will utilize a single type of interface, thus forcing the user to adapt to that particular interface's mode of interaction. One approach to providing the end user with a more user-friendly interface is to allow the end user to modify or customize the interface to meet their particular needs and usage patterns. Such an approach is provided in co-pending U.S. patent application Ser. No. 12/708,547. While this approach does provide a customizable, and thus improved, user interface, it does require that the user or a representative of the user (e.g., a manufacturer's service center) reconfigure the interface to match that particular user's preferences. In some instances, however, it may be undesirable to implement such a user configurable vehicle interface. Accordingly, what is needed is a single vehicle user interface that automatically matches the usage patterns and preferences of a variety of users. The present invention provides such a user interface.

SUMMARY OF THE INVENTION

The present invention provides a method of operating a vehicle user interface. The method includes the steps of providing a touch-screen display in the vehicle; displaying a general vehicle subsystem interface corresponding to a single vehicle subsystem (e.g., climate control or audio subsystem); displaying a plurality of touch-screen function controllers all corresponding to the single vehicle subsystem; accepting a first user touch via a first of the plurality of touch-screen function controllers, where the first touch-screen function controller corresponds to a single vehicle function of the single vehicle subsystem; transforming the general vehicle subsystem interface to a specific vehicle subsystem interface in response to the first user touch, where the specific vehicle subsystem interface corresponds to the single vehicle function; accepting additional user touch input via the specific vehicle subsystem interface, where the additional user touch input only affects the single vehicle function; and transforming the specific vehicle subsystem interface to the general vehicle subsystem interface after a preset period of time (e.g., less than 10 seconds) since acceptance of the last user touch input via the specific vehicle subsystem interface. The method may further comprise the step of enlarging the first touch-screen function controller when the general vehicle subsystem interface is transformed to the specific vehicle subsystem interface. The method may further comprise the step of eliminating a portion of the plurality of touch-screen function controllers when the general vehicle subsystem interface is transformed to the specific vehicle subsystem interface, where the eliminated touch-screen function controllers do not control the single vehicle function. The method may further comprise the steps of determining the control interaction technique utilized in the first user touch and selecting a feature set for the specific vehicle subsystem interface based on the outcome of the control interaction technique determining step. The method may further comprise the steps of determining the control interaction technique utilized in the first user touch and adding a second plurality of touch-screen function controllers to the specific vehicle subsystem interface based on the outcome of the control interaction technique determining step, wherein if the control interaction technique is a tapping input technique, some or all of the second plurality of touch-screen function controllers will utilize a tapping input technique; wherein if the control interaction technique is a touch-and-slide input technique, some or all of the second plurality of touch-screen function controllers will utilize a touch-and-slide input technique; and wherein if the control interaction technique is a touch-and-hold input technique, some or all of the second plurality of touch-screen function controllers will utilize a touch-and-hold input technique.

A method of operating a vehicle user interface is provided that includes the steps of providing a touch-screen display in the vehicle; displaying a vehicle subsystem interface; displaying a plurality of touch-screen function controllers; accepting user input via either a tapping technique or a touch-and-slide technique without altering the interface configuration and where either form of input yields the same response. In at least one embodiment, all of the touch-screen function controllers correspond to a single vehicle subsystem, for example a climate control or audio subsystem. In at least one embodiment, the interface also accepts user input via a touch-and-hold technique without altering the interface configuration, and where the same response is achieved as that utilizing either the tapping or touch-and-slide techniques.

A further understanding of the nature and advantages of the present invention may be realized by reference to the remaining portions of the specification and the drawings.

DESCRIPTION OF THE SPECIFIC EMBODIMENTS

Figure 1:
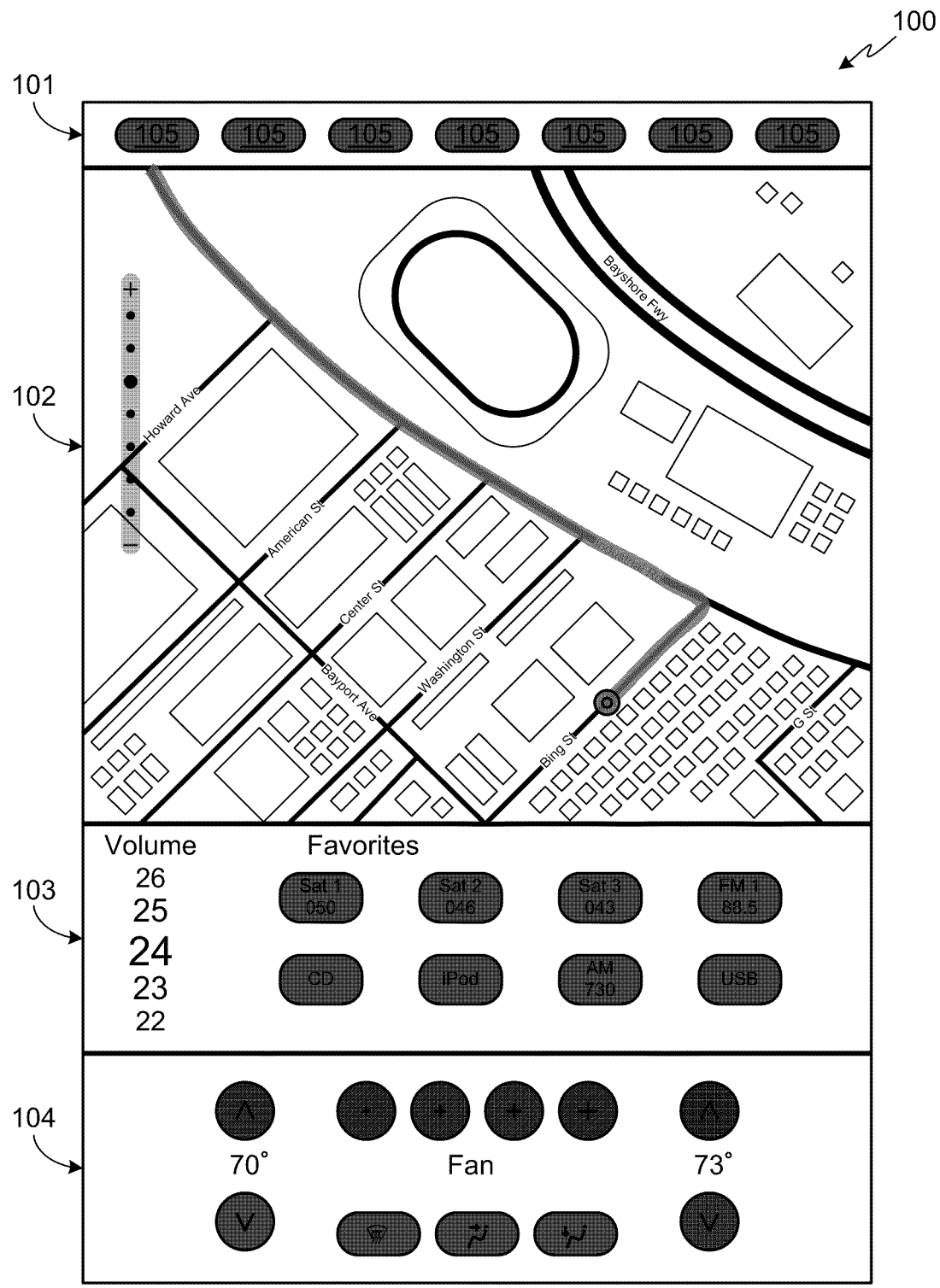
FIG. 1 illustrates a multi-zone, touch-screen vehicle user interface in accordance with the invention.

The present invention utilizes a touch-screen for the user interface. A large format touch-screen as illustrated in FIG. 1 is preferred, as such a screen is large enough to accommodate multiple interface zones as shown. The invention, however, is equally applicable to a smaller touch-screen interface, for example a single zone interface.

In the exemplary touch-screen system 100 shown in FIG. 1, the display 100 is divided into four zones 101-104. As shown, uppermost zone 101 is comprised of one or more soft buttons 105. Alternately, or in addition to soft buttons 105, zone 101 may be used to display system information, e.g., status of various subsystems, etc. As used herein, a soft button refers to a pre-defined, touch-sensitive region of display 100 that activates or otherwise controls a function in a manner similar to that of a hard button (i.e., a toggle switch, a push button, etc.). As soft buttons are well known in the art, further description will not be provided herein.

Preferably zone 101 is comprised of persistent soft buttons, i.e., soft buttons that persist regardless of how the remaining portion of display 100 is used. Persistent soft buttons 105 may be used, for example, to provide general display control settings or to provide the user with direct access to specific subsystems (e.g., climate control subsystem, audio subsystem, mobile/cell phone interface, navigation subsystem, etc.).

In the exemplary touch-screen shown in FIG. 1, the remaining portion of the display is divided into three zones. More specifically, zone 102 displays a navigation subsystem, zone 103 displays audio subsystem controls, and zone 104 displays climate subsystem controls.

Figure 2:
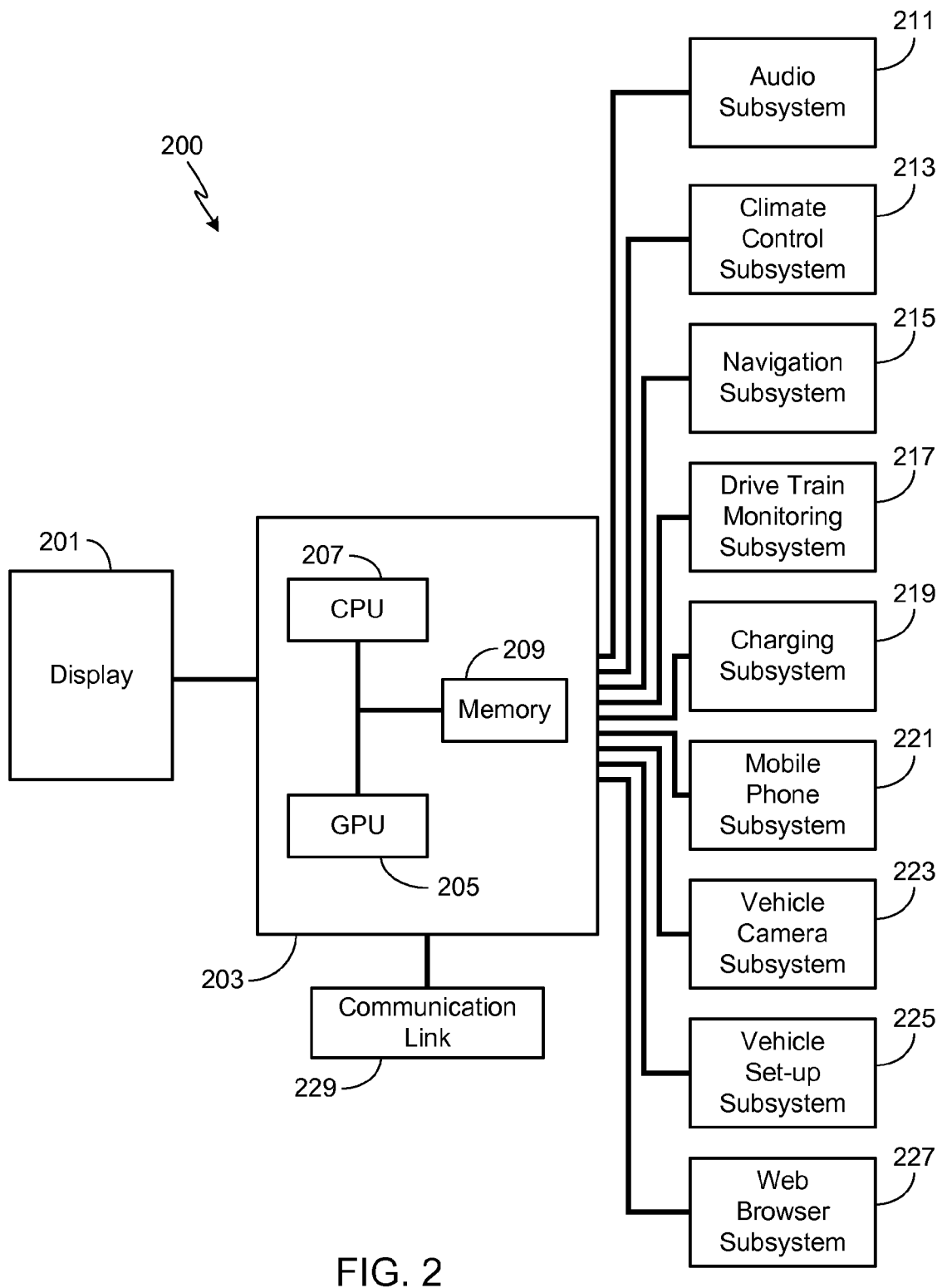
FIG. 2 provides a block diagram of an interface system suitable for use with the invention.

FIG. 2 provides a block diagram of an interface system 200 suitable for use with the invention. In system 200, a display 201 is coupled to a system controller 203. Display 201 may be a multi-zone display as shown in FIG. 1, or a single zone display. Controller 203 includes a graphical processing unit (GPU) 205, a central processing unit (CPU) 207, and memory 209. CPU 207 and GPU 205 may be separate or contained on a single chip set. Memory 209 may be comprised of flash memory, a solid state disk drive, a hard disk drive, or any other memory type or combination of memory types. Controller 203 is coupled to any of a variety of different vehicle subsystems, and in particular to the vehicle subsystems that are to accessed and/or viewed on display 201. Exemplary vehicle subsystems include audio subsystem 211, climate control subsystem 213, navigation subsystem 215, drive train subsystem 217, charging subsystem 219, mobile phone subsystem 221, vehicle camera subsystem 223, vehicle set-up subsystem 225 and web browser subsystem 227. Vehicle set-up subsystem 225 allows general vehicle operating conditions to be set, conditions such as seat position, moon roof or sun roof position/operation, internal and external lighting, windshield wiper operation, etc. Preferably a mobile telecommunications link 229 is also coupled to controller 203, thereby allowing the controller to obtain updates, interface configuration profiles, and other data from an external data source (e.g., manufacturer, service center, web-based application, remote home-based system, etc.). Mobile telecommunications link 229 may be based on any of a variety of different standards including, but not limited to, GSM EDGE, UMTS, CDMA2000, DECT, and WiMAX.

Figure 3:
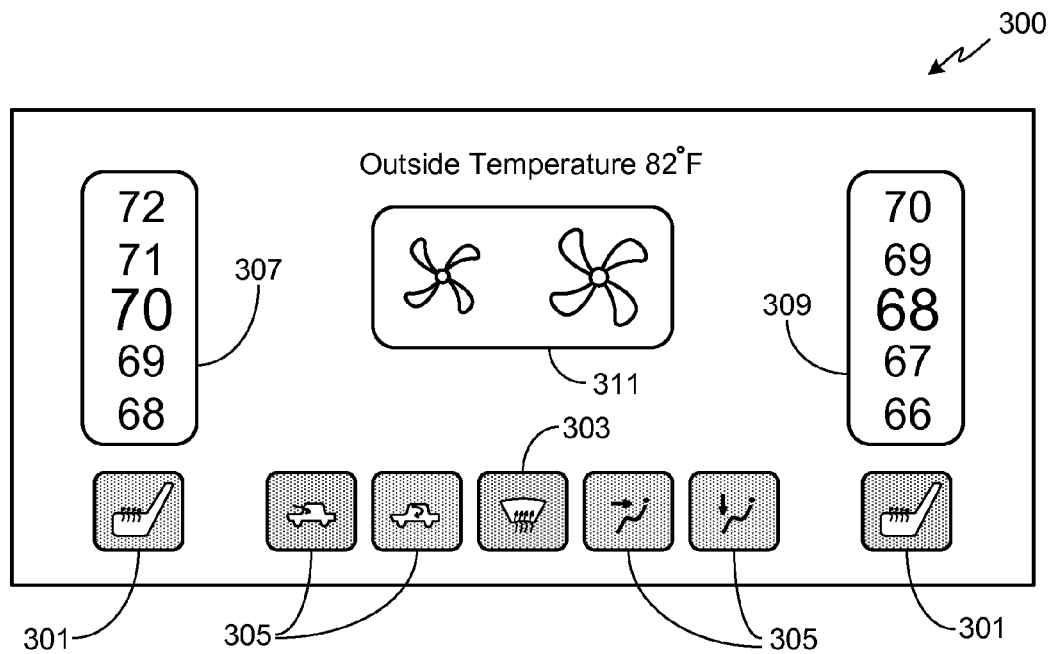
FIG. 3 illustrates a climate control interface in accordance with the invention.
Figure 4:
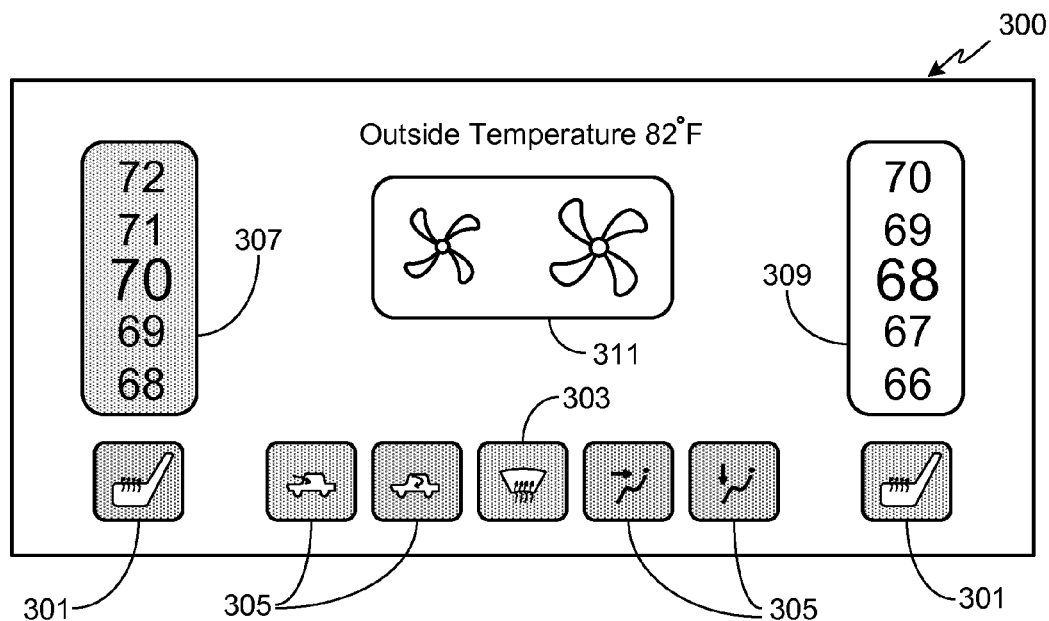
FIG. 4 illustrates the climate control interface of FIG. 3, with the region surrounding a user-selected controller highlighted.

FIG. 3 illustrates a climate control interface 300 in accordance with the invention. It will be appreciated that interface 300 may be one of a plurality of zones in a multi-zone display or the only zone in a single zone display. Additionally, while a climate control interface is used to illustrate the invention, the invention is equally applicable to other vehicle subsystem interfaces, for example an audio subsystem interface.

In a typical interface in accordance with the invention, one or more of the interface's functions operate in the same manner as in a conventional touch-screen utilizing a 'touch-on' and 'touch-off' feature. For example, in exemplary interface 300 seat heater soft buttons 301, defroster soft button 303 and air flow soft buttons 305 all operate conventionally such that each touch of the selected button cycles the corresponding subsystem function between an on state and off state.

Preferably those features of a particular subsystem that offer the user a range of possible selections, rather than a simple two-position switch (e.g., on/off), utilize one or more features of the invention as described in further detail below. In exemplary interface 300, driver temperature selector 307, passenger temperature selector 309, and fan speed selector 311 all fit within this category of control. In an audio subsystem interface, at a minimum the function controllers that typically operate in this manner include the volume control, channel selector, audio input selector, and tone controls. It will be understood that the invention is not limited to climate control and audio subsystem interfaces, nor is it limited to the specific function controllers noted above.

In at least one embodiment of the invention, one or more of the function controllers within a particular subsystem interface allow the user to utilize any of a variety of different control interaction techniques to perform the same function. Thus in contrast to a conventional function controller in which the user is required to conform to the control interaction technique that is pre-configured by the manufacturer or by another user, this aspect of the invention allows the user to interact with the controller in any of a variety of ways, thus making the interaction more natural and intuitive. Furthermore, as different users may prefer different ways of interacting with the interface, the invention allows each user, e.g., each driver or passenger, to utilize their preferred technique without requiring any reconfiguration of the interface. Thus, for example, one driver may increase the driver temperature from 70° to 72° by touching the number "72" and holding their finger on the desired temperature until controller 307 indicates that the new temperature has been input into the system (i.e., using a touch-and-hold control interaction technique). Indication of the selected temperature may be through the use of a different font size as illustrated, location within the controller's display region (e.g., centering the selected temperature as illustrated), or through other means (e.g., different font colors, different background colors, etc.). A different driver/user may prefer a tapping motion, e.g., tapping on the upper portion of the display region of function controller 307 to increase the temperature, or tapping on the lower portion of the display region of function controller 307 to decrease the temperature (i.e., using a tapping control interaction technique). Preferably in this approach the temperature changes by 1 degree per tap. Also preferably in this approach the location of the numbers within region 307 would change with each tap, thus indicating the presently selected temperature. Yet another driver/user may prefer a touch-and-slide control interaction technique, also referred to herein as a sliding or scrolling motion, thus mimicking the interaction with a rotating switch. In this approach the user increases the temperature to the desired temperature by touching interface 300 somewhere within the display region of function controller 307, and sliding their finger downwards on the interface until the controller indicates that the user has selected 72°, for example by highlighting the number "72" and/or centering the number "72" in region 307.

In at least one embodiment of the invention, when the user employs a touch-and-slide movement during interaction with a particular multi-position function controller (e.g., audio volume, fan speed, channel selector, temperature controller, etc.), the faster the sliding motion, the faster the speed with which the controlled function varies. In other words, a rapid sliding motion causes acceleration of the changing function, making the controller more responsive to finger movement during the user's touch-and-slide motion. For example, if a passenger touches the display region of function controller 309 and slowly moves their finger in an upwards motion, the temperature changes slowly. In contrast, if the passenger touches region 309 and then flicks or otherwise moves their finger in a rapid upwards motion, then the temperature varies rapidly, potentially moving to the lowest possible setting. Therefore this aspect of the invention allows the controller, and thus the user, to differentiate between fine function control and course function control while using a single function controller. This type of function acceleration is especially useful for interface applications such as the audio subsystem channel selector (e.g., AM, FM, or satellite channel selectors) where there is a wide selection range, but where fine control is required once the user nears the desired frequency or channel.

In at least one embodiment of the invention, when a particular interface function controller is engaged, the visual properties of the interface temporarily change. Changing the visual properties of the interface may be done in order to emphasize the function currently under control, for example by highlighting a particular function controller (e.g., temperature controllers 307/309, fan controller 311, etc.) once the user touches that control region of the display. Alternately, both the visual properties and the manner in which the user interacts with the function controller may change upon the user's initial touch/interaction with a particular function controller, thereby simplifying further user interaction with the selected function controller. The length of time that the visual or visual/interactive properties of the interface change may be configured by the manufacturer, a service representative, or by the end user. Preferably once the user interacts with the affected function controller, thereby causing the interface properties to change, they remain changed throughout the time in which the user is interacting with that particular interface function controller. In order to ensure that the interface properties remain unchanged during this time, the interface is configured to remain in its altered state for a preset period of time after the user's last screen touch (e.g., 5 seconds, 10 seconds, etc.). Typically this period of time is selected to ensure that the interface remains altered while the user's attention is diverted, for example due to the demands of driving, or while the user is still deciding on the final function setting.

FIGS. 4-8 illustrate some of the ways in which the visual or visual/interactive properties of an interface in general, and interface 300 in particular, may change after the user initiates interface interaction. As previously noted, in at least one embodiment after the user touches/interacts with a function controller, the functionality of the interface does not change, rather the appearance of the selected controller changes. For example, in FIG. 4 after the user first touches temperature controller 307, this region of interface 300 becomes highlighted. It will be appreciated that there are many different techniques that may be employed to highlight the selected controller such as changing the color or shading of the background or font, changing font size or style, changing from a 2-dimensional appearance to a 3-dimensional appearance, etc.

While simply highlighting a selected function controller aids user-interface navigation, the inventors have found that simplifying the overall interface and simultaneously expanding the selected controller provides additional benefits. For example, the interface may be configured so that when the user first touches a function controller such as temperature controller 307, the selected controller expands to cover a much larger region of the display screen as illustrated in the exemplary embodiment shown in FIG. 5. Expanding the function controller that is currently in use, in this case temperature controller 307, makes it much easier to input changes to the controller (e.g., temperature selections) since the user is interacting with a much larger region of the touch-screen. This is an especially useful feature as the user may be driving the vehicle or otherwise engaged and would therefore find it difficult to touch small regions of a non-expanded touch-screen display. Additionally, as some or all of the other interface features are preferably eliminated from the interface screen during this time, there are less distractive interface features, thus making it easier for the user to switch back and forth between interacting with the interface and driving the car (or performing some other task).

Figure 5:
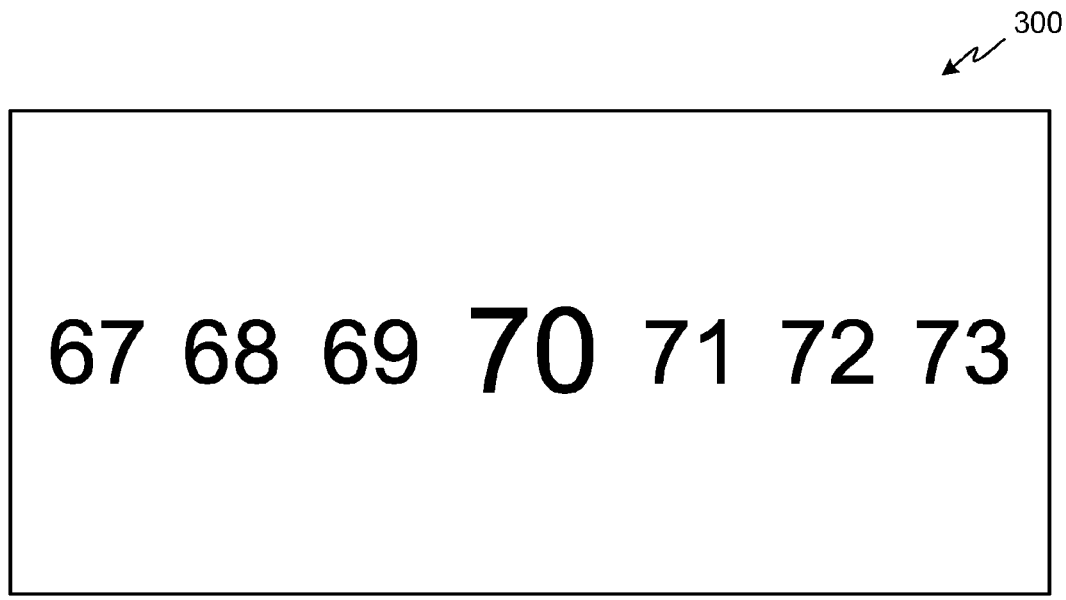
FIG. 5 illustrates an expanded user-selected controller.
Figure 6:
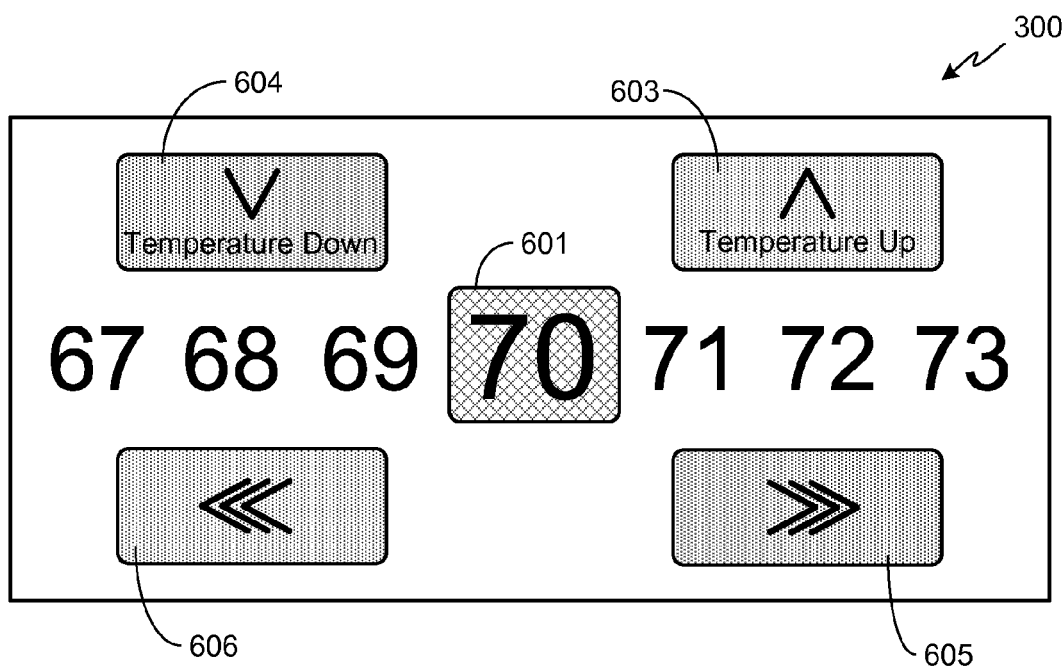
FIG. 6 illustrates an expanded user-selected controller with increased controller functionality.
Figure 7:
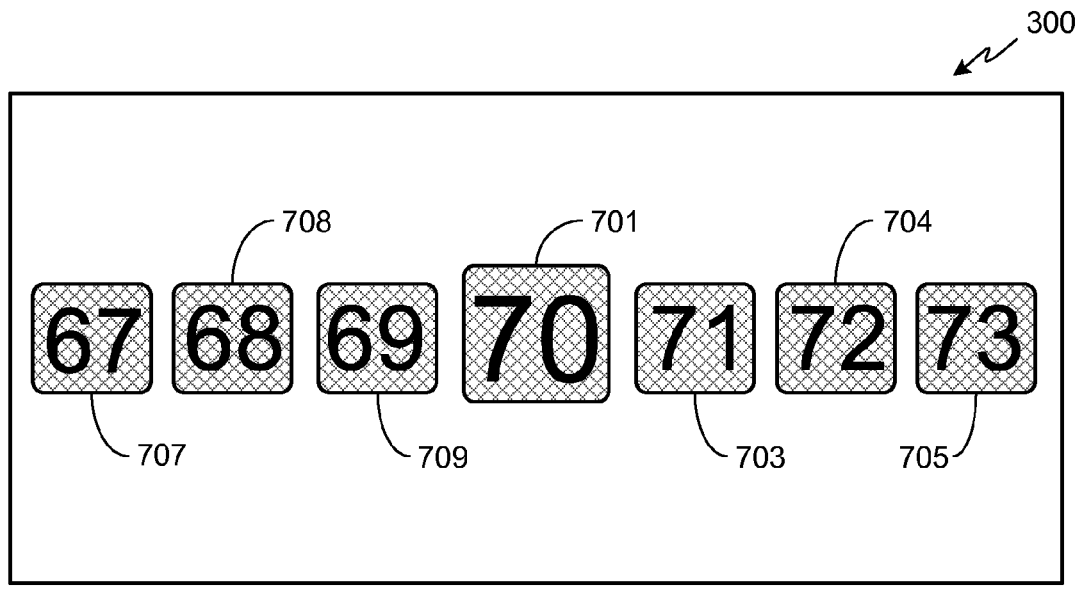
FIG. 7 illustrates an expanded user-selected controller with increased controller functionality, where the increased controller functionality is based on the user's initial interaction with the selected controller.

In addition to enlarging the selected function controller and eliminating some or all of the other, non-selected, functions from the interface, the present invention may be used to further aid user navigation for the selected controller, for example by adding additional control features to the interface when a particular controller is activated. For example, FIG. 6 illustrates interface 300 after a user has selected temperature controller 307. In addition to increasing the size of the temperature selection controller as shown in FIG. 5, in the embodiment shown in FIG. 6 the selected temperature is highlighted (e.g., highlight 601) so that the user can quickly identify the selected temperature. This screen also includes additional temperature control soft-buttons 603-606, thus further simplifying user interaction with the selected controller and control function. As shown, soft-buttons 603 and 604 provide temperature up and temperature down controls, respectively. Preferably soft-buttons 603 and 604 increase/decrease the temperature by one degree per touch, thus providing fine temperature control. Soft-buttons 605 and 606 provide rapid temperature up and temperature down control, respectively, for example by providing a scroll up/scroll down feature. It will be appreciated that these are simply exemplary controls and that other types of controls may be added to a particular function controller when it is selected in order to provide the user with a more easily navigated interface.

Figure 8:
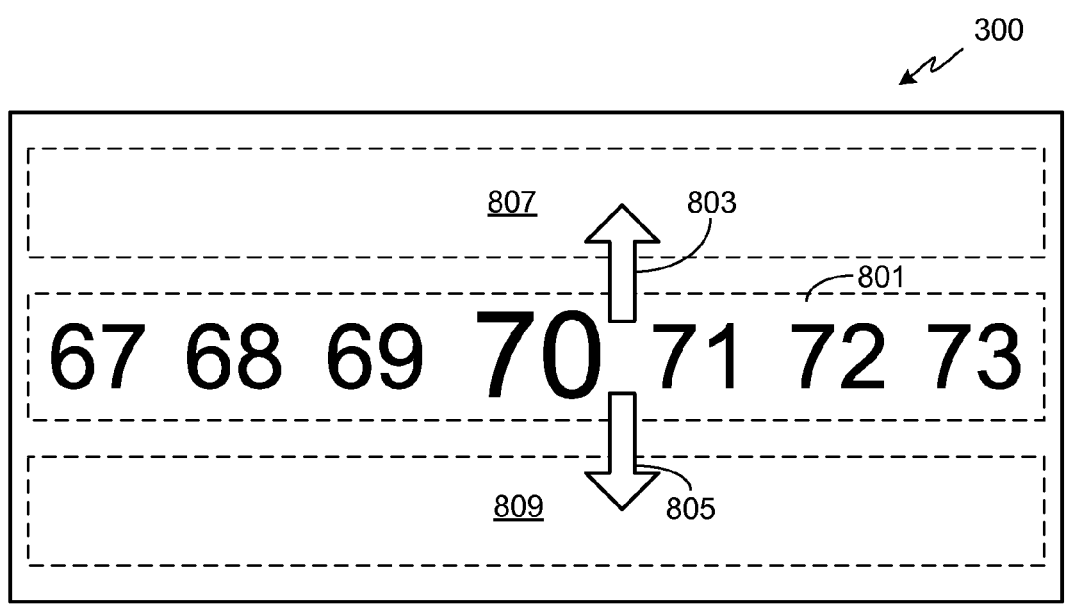
FIG. 8 illustrates an expanded user-selected controller with increased controller functionality, where the increased controller functionality is based on the user's initial interaction with the selected controller.

As previously disclosed, once a particular function controller is selected by a user, that controller's functionality may be expanded by adding additional function controls that are not included in the initial interface (e.g., additional controls 603-606). In a preferred embodiment, when the user interacts with a particular function controller, a new interface screen with additional controller functionality is displayed that is based on the way in which the user initially interacted with the display. For instance, if the user's initial interaction with controller 307 is by a tapping motion, then interface 300 may morph into a screen that emphasizes control via tapping. For example, in the exemplary screen shown in FIG. 7, tapping control is emphasized. As shown, in addition to increasing the size of the basic temperature controller as in the prior embodiment, a highlighted region surrounds each temperature, thus further simplifying temperature selection. Preferably the highlighted regions are color coded, thereby further simplifying temperature selection via tapping. In the exemplary interface, the highlighted region 701 that provides the presently selected temperature is white; highlighted regions 703-705 are red with the shade of red increasing with temperature (e.g., region 705 darker red than regions 703 and 704, etc.); and highlighted regions 707-709 are blue with the shade of blue increasing with decreasing temperature (e.g., region 707 darker blue than regions 708 and 709, etc.). FIG. 8 illustrates an alternate example of this same inventive feature, assuming that the user's initial interaction with control 307 is by a touch-and-slide motion, also referred to as a swiping motion. While FIG. 8 looks the same as FIG. 5, it provides additional functionality that is not included in the interface of FIG. 5. In particular, the interface shown in FIG. 8 allows the user to select temperature in the same manner as the controller on the initial display, e.g., temperature controller 307, but on an expanded region 801 (shown in phantom). Additionally, if after touching region 801 the user slides their finger upwards (i.e., in direction 803) or downwards (i.e., in direction 805) before sliding their finger left or right, the controller's response speed changes. In this example, if the user slides their finger upwards in direction 803 and then slides their finger left or right within region 807 (also shown in phantom), the temperature will increase or decrease more rapidly than if they moved their finger within region 801. Similarly, if the user slides their finger downwards in direction 805 and then slides their finger left or right within region 809 (also shown in phantom), the temperature will increase or decrease more gradually than if they moved their finger within region 801. Clearly more 807 or 809 regions may be included within the interface, thus providing further response speed control.

In at least one embodiment of the invention, the appearance of the display remains unchanged during interaction, but the zone of interaction expands. More specifically, after the user first touches a controller, the control region expands so that it is easier for the user to input his or her changes into the user interface. For example, if the user touches the fan controller 311, then for a preset period of time a much larger region of the display (e.g., a large region of the zone or a large region of the display) becomes the active input region even though there is no change in the overall appearance of the interface or the appearance of controller 311 in particular. In an exemplary configuration, after touching fan controller 311, the user may touch anyplace within the upper half of interface 300 to increase fan speed, or touch anyplace within the lower half of interface 300 to decrease fan speed. Alternately, after touching fan controller 311, the user may touch anywhere on interface 300 and slide their finger in a rightward motion to decrease fan speed, or touch anywhere on interface 300 and slide their finger in a leftward motion to increase fan speed. This aspect of the invention only requires that the user accurately position their finger in the desired control region once since after the initial touch the control region is greatly expanded. Typically the preset period of time in which the control region is expanded is relatively short (e.g., 1-10 seconds), thus allowing the user to interact with the desired function controller and then, within a relatively short period, interact with a different function controller.

In a minor variation of the previous embodiment, once the user touches a control region, their interaction with the selected region continues for as long as their finger remains in contact with the screen, regardless of whether or not their finger remains within the selected region. This aspect of the invention allows a user to briefly look at the interface, just long enough to correctly position their finger, and then look away while still controlling the selected function. For example, a user may touch the volume control of an audio interface and then continue to control the audio volume regardless of where their finger moves to on the display screen, as long as their finger remains in contact with the screen. Thus in this example the user may touch the volume control region, then increase the volume by moving their finger up or to the right, or decrease the volume by moving their finger down or to the left.

As will be understood by those familiar with the art, the present invention may be embodied in other specific forms without departing from the spirit or essential characteristics thereof. Accordingly, the disclosures, descriptions and figures provided herein are intended to be illustrative, but not limiting, of the scope of the invention which is set forth in the following claims.

What is claimed is:

1. A method of operating a vehicle user interface, the method comprising the steps of:
providing a touch-screen display mounted within a vehicle;
displaying a vehicle subsystem interface on said touch-screen display; and
displaying a plurality of touch-screen function controllers on said vehicle subsystem interface, wherein each of said plurality of touch-screen function controllers corresponds to at least one of a plurality of vehicle subsystem functions, and wherein each of at least a portion of said plurality of touch-screen function controllers accept each of a plurality of different control interaction techniques to perform the same vehicle subsystem function, wherein said plurality of different control interaction techniques include at least a tapping control interaction technique and a touch-and-slide control interaction technique, wherein the same vehicle subsystem function performed by the plurality of different control interaction techniques has a value, wherein the tapping control interaction technique comprises increasing or decreasing the value depending on where a tap is made on the touch-screen display, and wherein the touch-and-slide control interaction technique comprises increasing or decreasing the value depending on a direction of a sliding motion made on the touch-screen display; wherein at least one of the portion of said plurality of touch-screen function controllers is configured so that an active input region expands during interaction whereas an appearance of the touch-screen display remains unchanged, such that for a preset period of time after a user touches the touch-screen function controller a larger region of the touch-screen display becomes the active input region although the appearance of the touch-screen display remains unchanged.

2. The method of claim 1, further comprising the steps of:
accepting a touch of a user via one of said plurality of touch-screen function controllers, wherein said one of said plurality of touch-screen function controllers corresponds to a single vehicle function of a single vehicle subsystem; and
enlarging said one of said plurality of touch-screen function controllers from a first size to a second size in response to said touch.

3. The method of claim 1, further comprising the steps of:
accepting a touch of a user via one of said plurality of touch-screen function controllers, wherein said one of said plurality of touch-screen function controllers corresponds to a single vehicle function of a single vehicle subsystem; and
eliminating a subset of said plurality of touch-screen function controllers from said vehicle subsystem interface, wherein said subset of said plurality of touch-screen function controllers eliminated from said vehicle subsystem interface do not control said single vehicle function.

4. The method of claim 1, further comprising the steps of:
accepting a touch of a user via one of said plurality of touch-screen function controllers, wherein said one of said plurality of touch-screen function controllers corresponds to a single vehicle function of a single vehicle subsystem; and
adding a second plurality of touch-screen function controllers to said vehicle subsystem interface in response to said touch, wherein each of said second plurality of touch-screen function controllers provides control over said single vehicle function.

5. The method of claim 1, further comprising the step of accepting a touch input of a user via one of said plurality of touch-screen function controllers, wherein said one of said plurality of touch-screen function controllers corresponds to a single vehicle function of a single vehicle subsystem, wherein if said touch input utilizes said touch-and-slide control interaction technique said method further comprises the step of varying control speed over said single vehicle function in response to an input speed corresponding to a sliding motion of said touch input.

6. The method of claim 1, further comprising the steps of:
accepting a touch of a user via one of said plurality of touch-screen function controllers, wherein said user utilizes one of said plurality of different control interaction techniques, and wherein said one of said plurality of touch-screen function controllers corresponds to a single vehicle function of a single vehicle subsystem;
identifying a specific control interaction technique of said plurality of different control interaction techniques that corresponds to said touch of said user; and
modifying at least a subset of said plurality of touch-screen function controllers to emphasize said specific control interaction technique.

7. The method of claim 1, further comprising the steps of:
accepting a touch of a user via one of said plurality of touch-screen function controllers, wherein said user utilizes one of said plurality of different control interaction techniques, and wherein said one of said plurality of touch-screen function controllers corresponds to a single vehicle function of a single vehicle subsystem;
identifying a specific control interaction technique of said plurality of different control interaction techniques that corresponds to said touch of said user; and
adding a second plurality of touch-screen function controllers to said vehicle subsystem interface, wherein each of said second plurality of touch-screen function controllers provides control over said single vehicle subsystem, and wherein each of said second plurality of touch-screen function controllers utilizes said specific control interaction technique.

8. The method of claim 7, wherein said specific control interaction technique is said tapping control interaction technique, and wherein at least a portion of said second plurality of touch-screen function controllers utilize said tapping control interaction technique.

9. The method of claim 7, wherein said specific control interaction technique is said tapping control interaction technique, and wherein all of said second plurality of touch-screen function controllers utilize said tapping control interaction technique.

10. The method of claim 7, wherein said specific control interaction technique is said touch-and-slide control interaction technique, and wherein at least a portion of said second plurality of touch-screen function controllers utilize said touch-and-slide control interaction technique.

11. The method of claim 7, wherein said specific control interaction technique is said touch-and-slide control interaction technique, and wherein all of said second plurality of touch-screen function controllers utilize said touch-and-slide control interaction technique.

12. The method of claim 1, wherein said plurality of different control interaction techniques further includes a touch-and-hold control interaction technique, and wherein said method further comprises the steps of:

accepting a touch of a user via one of said plurality of touch-screen function controllers, wherein said user utilizes said touch-and-hold control interaction technique, and wherein said one of said plurality of touch-screen function controllers corresponds to a single vehicle function of a single vehicle subsystem;

adding a second plurality of touch-screen function controllers to said vehicle subsystem interface, wherein each of said second plurality of touch-screen function controllers provides control over said single vehicle subsystem, and wherein at least a portion of said second plurality of touch-screen function controllers utilize said touch-and-hold control interaction technique.

13. The method of claim 1, wherein said plurality of different control interaction techniques further includes a touch-and-hold control interaction technique, and wherein said method further comprises the steps of:

accepting a touch of a user via one of said plurality of touch-screen function controllers, wherein said user utilizes said touch-and-hold control interaction technique, and wherein said one of said plurality of touch-screen function controllers corresponds to a single vehicle function of a single vehicle subsystem;

adding a second plurality of touch-screen function controllers to said vehicle subsystem interface, wherein each of said second plurality of touch-screen function controllers provides control over said single vehicle subsystem, and wherein all of said second plurality of touch-screen function controllers utilize said touch-and-hold control interaction technique.

14. The method of claim 1, wherein said vehicle subsystem interface is selected from the group consisting of climate control subsystem interfaces and audio subsystem interfaces.

15. The method of claim 1, wherein said plurality of different control interaction techniques further includes a touch-and-hold control interaction technique.

16. The method of claim 1, wherein the same vehicle subsystem function performed by the plurality of different control interaction techniques comprises a temperature control.

17. The method of claim 1, wherein within the preset period of time after the user touches the touch-screen function controller: an additional touch anyplace within an upper half of the touch-screen display causes the value to increase, and an additional touch anyplace within a lower half of the touch-screen display causes the value to decrease.

18. The method of claim 1, wherein within the preset period of time after the user touches the touch-screen function controller: a rightward motion sliding input anywhere on the touch-screen display causes the value to decrease, and a leftward motion sliding input anywhere on the touch-screen display causes the value to increase.

19. The method of claim 1, wherein within the preset period of time after the user touches the touch-screen function controller: the interaction with the touch-screen function controller continues for as long as the user's finger remains in contact with the touch-screen display, regardless of whether the finger remains in contact with the displayed touch-screen function controller.

20. The method of claim 19, wherein the interaction comprises at least one selected from the group consisting of:

an upward motion sliding input causes the value to increase;

a rightward motion sliding input causes the value to increase;

a downward motion sliding input causes the value to decrease; and a leftward motion sliding input causes the value to decrease.

* * * * *